(12) United States Patent
Dion et al.

(10) Patent No.: US 11,963,007 B2
(45) Date of Patent: Apr. 16, 2024

(54) FACILITATING RESIDENTIAL WIRELESS ROAMING VIA VPN CONNECTIVITY OVER PUBLIC SERVICE PROVIDER NETWORKS

(71) Applicant: Nokia Technologies Oy, Espoo (FI)

(72) Inventors: Gino Dion, New Brunswick (CA); Randall B. Sharpe, Chapel Hill, NC (US)

(73) Assignee: Nokia Technologies Oy, Espoo (FI)

( * ) Notice: Subject to any disclaimer, the term of this patent is extended or adjusted under 35 U.S.C. 154(b) by 96 days.

(21) Appl. No.: 17/055,637

(22) PCT Filed: May 17, 2018

(86) PCT No.: PCT/US2018/033159
§ 371 (c)(1),
(2) Date: Nov. 16, 2020

(87) PCT Pub. No.: WO2019/221738
PCT Pub. Date: Nov. 21, 2019

(65) Prior Publication Data
US 2021/0211878 A1 Jul. 8, 2021

(51) Int. Cl.
*H04M 1/66* (2006.01)
*H04L 9/40* (2022.01)
(Continued)

(52) U.S. Cl.
CPC ....... *H04W 12/069* (2021.01); *H04L 12/4633* (2013.01); *H04L 63/0272* (2013.01); *H04W 12/61* (2021.01)

(58) Field of Classification Search
CPC ... H04W 12/069; H04W 12/61; H04W 84/12; H04W 12/06; H04W 12/63;
(Continued)

(56) References Cited

U.S. PATENT DOCUMENTS

| 6,615,347 | B1 * | 9/2003 | de Silva | H04L 9/3263 |
| | | | | 713/157 |
| 7,664,676 | B2 * | 2/2010 | Van Do | G06Q 30/0641 |
| | | | | 705/27.1 |

(Continued)

FOREIGN PATENT DOCUMENTS

| CN | 1602107 A | 3/2005 |
| CN | 1838829 A | 9/2006 |

(Continued)

*Primary Examiner* — Stephen M D Agosta
(74) *Attorney, Agent, or Firm* — Harrington & Smith

(57) ABSTRACT

Example embodiments include a method for receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; transmitting at least one probe request message to at least one public access point, wherein the probe request message includes at least the first digital certificate; receiving from the at least one public access point a probe response message including information for remotely accessing the wireless local area network via a virtual private network connection established between the public access point and the home access point.

19 Claims, 7 Drawing Sheets

(51) Int. Cl.
  *H04L 12/46* (2006.01)
  *H04M 1/68* (2006.01)
  *H04M 3/16* (2006.01)
  *H04W 12/069* (2021.01)
  *H04W 12/61* (2021.01)

(58) Field of Classification Search
  CPC ............ H04L 12/4633; H04L 63/0272; H04L 63/0823; H04L 63/20; H04M 2250/02; H04M 15/43; H04M 15/49; H04M 15/52
  See application file for complete search history.

(56) References Cited

U.S. PATENT DOCUMENTS

| | | | | |
|---|---|---|---|---|
| 7,738,426 B2* | 6/2010 | Smith | | H04W 88/16 455/439 |
| 8,223,717 B2* | 7/2012 | Dillon | | H04L 65/103 370/331 |
| 8,412,837 B1* | 4/2013 | Emigh | | H04L 9/30 705/65 |
| 8,594,628 B1* | 11/2013 | Schroeder | | H04W 12/062 455/410 |
| 9,003,498 B2* | 4/2015 | Aboughanaima | | H04L 63/08 726/4 |
| 9,288,671 B2* | 3/2016 | Coghlan | | H04W 12/069 |
| 9,294,468 B1* | 3/2016 | Kilbourn | | H04L 9/3263 |
| 9,300,474 B2* | 3/2016 | Dupré | | H04W 12/069 |
| 9,576,119 B2* | 2/2017 | McGeehan | | H04L 63/08 |
| 9,578,499 B2* | 2/2017 | Brill | | H04W 12/30 |
| 9,742,851 B2* | 8/2017 | Petersson | | H04L 65/1069 |
| 9,967,906 B2 | 5/2018 | Verkaik et al. | | |
| 10,034,168 B1* | 7/2018 | Reeves | | H04W 12/069 |
| 10,063,561 B1* | 8/2018 | Benskin | | H04L 63/102 |
| 10,142,172 B2* | 11/2018 | Poosala | | H04L 63/029 |
| 10,148,759 B2* | 12/2018 | Lauer | | H04W 4/12 |
| 10,382,956 B2* | 8/2019 | Maria | | H04W 12/041 |
| 10,420,055 B2* | 9/2019 | Zhang | | H04W 8/18 |
| 10,701,550 B2* | 6/2020 | Park | | H04W 8/20 |
| 10,728,276 B1* | 7/2020 | Benskin | | G06F 21/44 |
| 10,743,177 B2* | 8/2020 | Dimperio | | H04L 63/0853 |
| 10,764,745 B2* | 9/2020 | Li | | H04W 12/40 |
| 2002/0022483 A1* | 2/2002 | Thompson | | H04L 29/12783 455/433 |
| 2002/0071563 A1* | 6/2002 | Kurn | | H04L 9/16 380/280 |
| 2002/0191635 A1* | 12/2002 | Chow | | H04L 12/2801 370/386 |
| 2003/0041136 A1* | 2/2003 | Cheline | | H04L 67/34 726/15 |
| 2003/0131131 A1* | 7/2003 | Yamada | | H04L 47/125 709/238 |
| 2003/0176188 A1* | 9/2003 | O'Neill | | H04L 63/08 455/433 |
| 2003/0214955 A1* | 11/2003 | Kim | | H04L 63/08 370/389 |
| 2003/0237004 A1* | 12/2003 | Okamura | | H04L 63/0823 713/176 |
| 2004/0054905 A1* | 3/2004 | Reader | | H04W 12/06 713/171 |
| 2005/0100166 A1* | 5/2005 | Smetters | | H04L 63/0492 726/4 |
| 2005/0185626 A1* | 8/2005 | Meier | | H04L 63/104 370/338 |
| 2005/0210254 A1* | 9/2005 | Gabryjelski | | H04L 9/3263 713/175 |
| 2005/0265553 A1* | 12/2005 | Thermond | | H04L 47/70 380/275 |
| 2006/0002356 A1* | 1/2006 | Barany | | H04W 8/06 455/433 |
| 2006/0019635 A1* | 1/2006 | Ollila | | H04L 63/08 455/410 |
| 2006/0098614 A1* | 5/2006 | Moon | | H04W 12/06 370/352 |
| 2006/0117104 A1* | 6/2006 | Taniguchi | | H04L 63/0428 709/225 |
| 2006/0136726 A1* | 6/2006 | Ragnet | | G06F 21/608 713/171 |
| 2006/0184452 A1* | 8/2006 | Barnes | | H04L 9/3268 705/50 |
| 2006/0221919 A1* | 10/2006 | McRae | | H04W 48/16 370/338 |
| 2007/0083470 A1* | 4/2007 | Bonner | | H04W 48/02 705/51 |
| 2007/0263577 A1* | 11/2007 | Gallo | | H04L 9/3263 370/338 |
| 2008/0109880 A1* | 5/2008 | Shiu | | H04W 12/069 726/3 |
| 2008/0301773 A1* | 12/2008 | Achtari | | H04W 36/0038 726/3 |
| 2009/0031415 A1* | 1/2009 | Aldridge | | H04L 63/0272 726/15 |
| 2009/0052393 A1* | 2/2009 | Sood | | H04W 12/062 455/411 |
| 2009/0150665 A1* | 6/2009 | Kaippallimalil | | H04L 63/08 713/153 |
| 2009/0172798 A1* | 7/2009 | Upp | | H04W 12/06 726/10 |
| 2009/0185495 A1* | 7/2009 | Zi | | H04L 45/28 370/244 |
| 2009/0217033 A1* | 8/2009 | Costa | | H04L 63/08 380/270 |
| 2009/0217048 A1* | 8/2009 | Smith | | H04W 12/041 713/176 |
| 2009/0222902 A1* | 9/2009 | Bender | | H04L 63/0823 726/10 |
| 2009/0225762 A1* | 9/2009 | Davidson | | H04W 28/24 370/401 |
| 2010/0100951 A1* | 4/2010 | Kutt | | G06Q 30/0601 705/26.1 |
| 2012/0008554 A1* | 1/2012 | Kim | | H04W 76/12 370/328 |
| 2012/0088473 A1* | 4/2012 | Jussila | | H04W 12/069 455/411 |
| 2012/0204245 A1* | 8/2012 | Ting | | H04L 9/3228 726/8 |
| 2012/0331528 A1* | 12/2012 | Fu | | H04L 67/10 726/4 |
| 2013/0086665 A1* | 4/2013 | Filippi | | H04W 12/062 726/7 |
| 2013/0132948 A1* | 5/2013 | Hari | | G06F 9/5072 718/1 |
| 2013/0247161 A1* | 9/2013 | Bajko | | H04L 9/3268 726/7 |
| 2014/0066015 A1* | 3/2014 | Aissi | | H04W 4/60 455/411 |
| 2014/0115676 A1* | 4/2014 | Coghlan | | H04W 12/069 726/6 |
| 2014/0201315 A1* | 7/2014 | Jacob | | H04L 12/2803 709/217 |
| 2014/0269251 A1* | 9/2014 | Zhou | | H04W 24/04 370/242 |
| 2014/0280938 A1* | 9/2014 | Kadaba | | H04L 12/4633 709/225 |
| 2014/0342731 A1* | 11/2014 | Carames | | H04W 8/18 455/432.1 |
| 2015/0146704 A1* | 5/2015 | Yoon | | H04W 48/14 370/338 |
| 2015/0326612 A1* | 11/2015 | Faccin | | H04W 48/16 726/1 |
| 2016/0105883 A1* | 4/2016 | Ghai | | H04L 12/6418 370/329 |
| 2016/0135116 A1* | 5/2016 | Chen | | H04W 48/20 455/450 |
| 2016/0198501 A1* | 7/2016 | Verkaik | | H04W 8/04 370/329 |
| 2016/0242111 A1* | 8/2016 | Wakabayashi | | H04W 4/70 |
| 2016/0261596 A1* | 9/2016 | Khello | | H04W 12/06 |
| 2016/0295386 A1* | 10/2016 | Faccin | | H04W 4/029 |
| 2016/0309382 A1* | 10/2016 | Silver | | H04W 36/0022 |

(56) References Cited

U.S. PATENT DOCUMENTS

| | | | |
|---|---|---|---|
| 2017/0005914 A1* | 1/2017 | Edge | H04W 8/082 |
| 2017/0063834 A1* | 3/2017 | Gryb | H04L 63/0876 |
| 2017/0156043 A1* | 6/2017 | Li | H04W 76/11 |
| 2017/0324566 A1* | 11/2017 | Kawasaki | H04L 9/006 |
| 2017/0325094 A1* | 11/2017 | Lee | H04W 12/06 |
| 2018/0063111 A1* | 3/2018 | Vasudevan | H04W 12/06 |
| 2018/0077564 A1* | 3/2018 | Xu | H04W 48/04 |
| 2018/0091480 A1* | 3/2018 | Brown | H04W 12/12 |
| 2018/0124597 A1* | 5/2018 | Malthankar | H04L 9/3249 |
| 2018/0206117 A1* | 7/2018 | Stahl | H04W 12/069 |
| 2019/0289464 A1* | 9/2019 | Loreskar | H04L 9/3247 |
| 2021/0211878 A1* | 7/2021 | Dion | H04W 12/61 |
| 2022/0053401 A1* | 2/2022 | Foti | H04W 36/32 |
| 2022/0108018 A1* | 4/2022 | Osorio Lozano | H04L 9/0894 |
| 2023/0039335 A1* | 2/2023 | Nam | H04L 9/0894 |

FOREIGN PATENT DOCUMENTS

| | | |
|---|---|---|
| CN | 101018174 A | 8/2007 |
| CN | 101330504 A | 12/2008 |
| CN | 101541004 A | 9/2009 |
| CN | 103634796 A | 3/2014 |
| EP | 2 405 678 A1 | 1/2012 |
| WO | WO 2012/172533 | 12/2012 |

* cited by examiner

FACILITATING RESIDENTIAL WIRELESS ROAMING VIA VPN CONNECTIVITY OVER PUBLIC SERVICE PROVIDER NETWORKS

CROSS REFERENCE TO RELATED APPLICATION

This patent application is a U.S. National Stage application of International Patent Application Number PCT/US2018/033159 filed May 17, 2018, which is hereby incorporated by reference in its entirety.

TECHNICAL FIELD

Various example embodiments relate generally to wireless networks and, more specifically, relates to residential wireless roaming, such as residential WiFi wireless roaming.

BACKGROUND

Wireless networks, such as WiFI for example, have practically become an essential service in today's world, with just about every type of consumer, entertainment, and communication device having WiFi connectivity support (e.g. smartphones, televisions, tablets, refrigerators, cameras, security systems, etc.).

Abbreviations that may be found in the specification and/or the drawing figures are defined below, after the main part of the detailed description section.

BRIEF SUMMARY

This section is intended to include examples and is not intended to be limiting.

According to an example of an embodiment, a method is provided including: receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; transmitting at least one probe request message to at least one public access point, wherein the probe request message comprises at least the first digital certificate; and receiving from the at least one public access point a probe response message comprising information for remotely accessing the wireless local area network via a virtual private network connection established between the public access point and the home access point.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receive, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; transmit at least one probe request message to at least one public access point, wherein the probe request message comprises at least the first digital certificate; and receive from the at least one public access point a probe response message comprising information for remotely accessing the wireless local area network via a virtual private network connection established between the public access point and the home access point.

In another example of an embodiment, an apparatus comprises means for receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; means for transmitting at least one probe request message to at least one public access point, wherein the probe request message comprises at least the first digital certificate; and means for receiving from the at least one public access point a probe response message comprising information for remotely accessing the wireless local area network via a virtual private network connection established between the public access point and the home access point.

According to another example of an embodiment, a method is provided including: receiving, at a public access point from a user device, a probe request message for requesting remote access to a wireless local area network associated with the user device, wherein the probe request message comprises at least a first digital certificate issued to the user device by a certificate authority associated with a service provider; communicating, by the public access point, with the certificate authority to verify the first digital certificate of the user device; in response to verifying the first digital certificate, establishing a virtual private network connection between the public access point and a home access point registered with the certificate authority; and transmitting a probe response message to the user device comprising information for connecting the user device to the wireless local area network via the virtual private network connection.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receive, at a public access point from a user device, a probe request message for requesting remote access to a wireless local area network associated with the user device, wherein the probe request message comprises at least a first digital certificate issued to the user device by a certificate authority associated with a service provider; communicate, by the public access point, with the certificate authority to verify the first digital certificate of the user device; in response to verification of the first digital certificate, establish a virtual private network connection between the public access point and a home access point registered with the certificate authority; and transmit a probe response message to the user device comprising information for connecting the user device to the wireless local area network via the virtual private network connection.

In another example of an embodiment, an apparatus comprises means for receiving, at a public access point from a user device, a probe request message for requesting remote access to a wireless local area network associated with the user device, wherein the probe request message comprises at least a first digital certificate issued to the user device by a certificate authority associated with a service provider; means for communicating, by the public access point, with the certificate authority to verify the first digital certificate of the user device; in response to verifying the first digital certificate, means for establishing a virtual private network connection between the public access point and a home access point registered with the certificate authority; and means for transmitting a probe response message to the user device comprising information for connecting the user device to the wireless local area network via the virtual private network connection.

According to an example of an embodiment, a method is provided including: receiving, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; communicating with the certificate authority to obtain a first digital certificate for the user device; and transmitting, from the home access point to the user device, the first digital certificate.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to at least: receive, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; communicate with the certificate authority to obtain a first digital certificate for the user device; and transmit, from the home access point to the user device, the first digital certificate.

In another example of an embodiment, an apparatus comprises means for receiving, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; means for communicating with the certificate authority to obtain a first digital certificate for the user device; and means for transmitting, from the home access point to the user device, the first digital certificate.

BRIEF DESCRIPTION OF THE DRAWINGS

Some example embodiments will now be described with reference to the accompanying drawings.

DETAILED DESCRIPTION

The description below generally refers to WiFi networks, however, it is not intended to be limiting and the teachings herein may also be applicable to other wireless networks.

A residential wireless network (such as in-home WiFi wireless network for example) often provides critical access, and bridges, to other communications and connectivity forms, such as ZigBee and Bluetooth for example.

Typically, when an end-user device leaves the in-home WiFi service, they may still connect to other private and/or public WiFi services for Internet and/or Cloud based services, however, the user will not have the same access to its native in-home network and services, at least not without remote connectivity options such as dynamic DNS, VPN, and Port tunneling, for example. These remote connectivity options are often too cumbersome or complicated for the average consumer.

Various embodiments described herein allow end-user mobile devices that are associated with a given residential in-home network, to negotiate a connection back to its native in-home service, via a public WiFi service (such as a Service Provider WiFi Hotspot for example) using an automated and auto-configured network level VPN. This may be performed automatically and transparently, without needing any special activation or interaction from the end-user.

Various example embodiments herein describe techniques for facilitating residential WiFi roaming via VPN connectivity over Public Service Provider Networks. Additional description of these techniques is presented after a system into which the exemplary embodiments may be used is described.

For simplicity, the term 'CPE' (Customer Provided Equipment) is used herein to refer to one or more network components that perform the functions of a modem (such as a DSL modem or cable modem), a network switch, a network router, a residential wireless gateway and/or a wireless access point. At least one of the components may be provided and/or associated with a service provider to allow access to other networks and/or the internet via the service provider. Further, at least some of the network functions may be provided virtually, such as the case may be with virtual consumer provided equipment (which may be referred to as 'vCPE'). In such embodiments, for example, a vBG (virtual bridged gateway) in the CPE may connect to a virtual gateway (vG) in the network through a tunnel, such as a logical subscriber link (LSL) as described in BBF Specification TR-317 for example. In this situation, a VPN may be established to the vCPE (vG) rather than to the CPE. Similarly, it is noted that a public AP as used herein may also include a vBG connected to a vG in the network through a tunnel.

Figure 1:
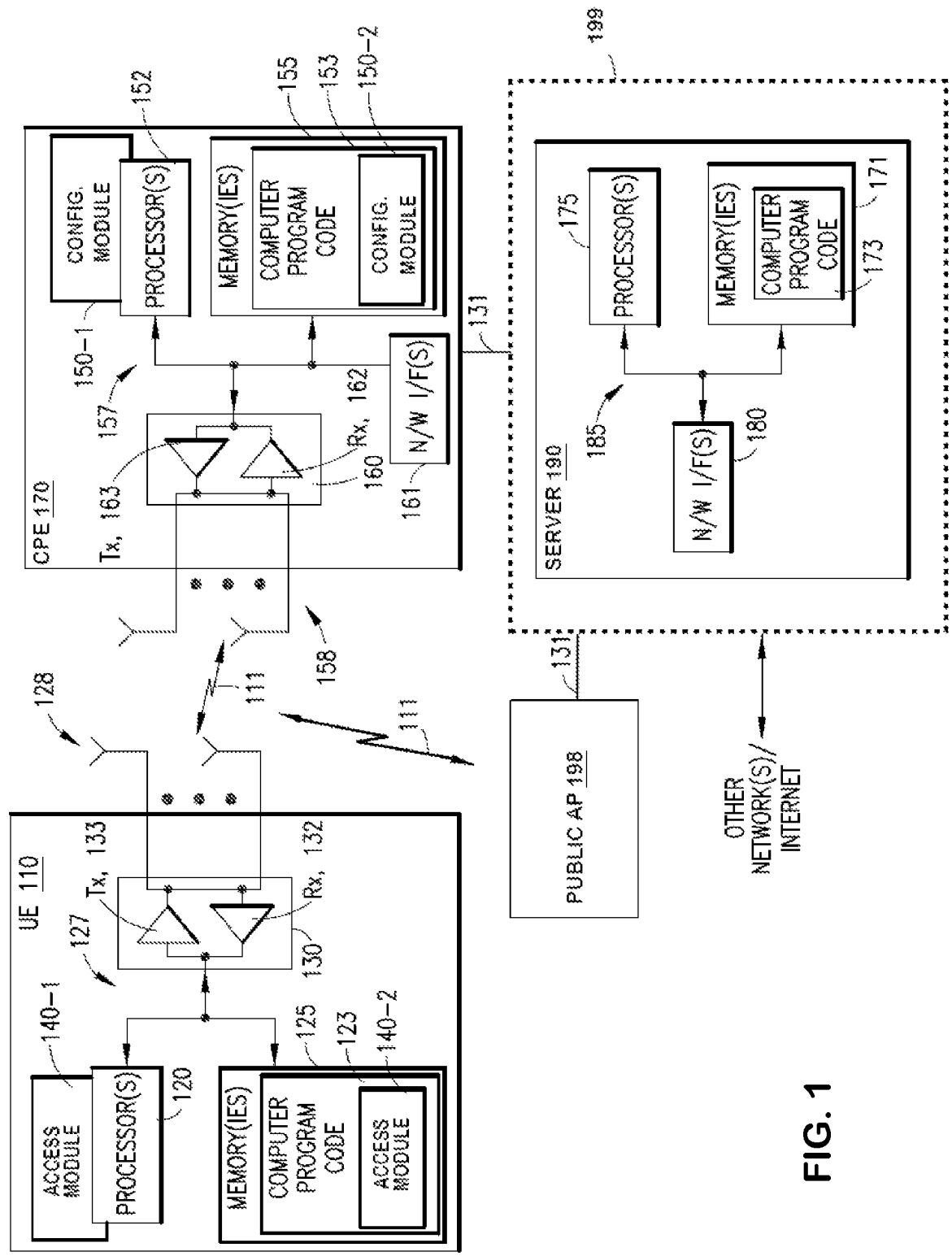
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user device (UD) 110 is in wireless communication with one or more access points (such as Public AP 198 and/or CPE 170 for example). A UD is a wireless, typically mobile device that can access a wireless network, such as a WiFi network for example. The UD 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UD 110 includes an access module, comprising one of or both parts 140-1 and/or 140-2, which may be implemented in a number of ways. The access module may be implemented in hardware as access module 140-1, such as being implemented as part of the one or more processors 120. The access module 140-1 may be implemented also as an integrated circuit or through other hardware such as a programmable gate array. In another example, the access module may be implemented as access module 140-2, which is implemented as computer program code 123 and is executed by the one or more processors 120. For instance, the one or more memories 125 and the computer program code 123 may be configured to, with the one or more processors 120, cause the user device 110 to perform one or more of the operations as described herein. The UD 110 communicates with Customer Provided Equipment (CPE) 170 and/or Public AP 198 via wireless links 111.

The CPE 170 includes an access point for providing one or more user devices (such as UD 110) access to, e.g., a local area network (e.g. home network). The CPE 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CPE 170 includes a configuration (config.) module, comprising one of or both parts 150-1 and/or 150-2, which may be implemented in a number of ways. The configuration module may be implemented in hardware as configuration module 150-1, such as being implemented as part of the one or more processors 152. The configuration module 150-1 may be implemented also as an integrated circuit or through other hardware such as a programmable gate array. In another example, the configuration module 150 may be implemented as configuration module 150-2, which is implemented as computer program code 153 and is executed by the one or more processors 152. For instance, the one or more memories 155 and the computer program code 153 are configured to, with the one or more processors 152, cause the CPE 170 to perform one or more of the operations as described herein. Although description CPE 170 may also represent a home/residential gateway for connecting the LAN to other networks such as a wide area network (WAN) 199 and/or the internet via a service provider for example. For example, the one or more network interfaces 161 communicate with a WAN 199 such as via a wireless or wired link 131. The WAN 199 may correspond to a service provider network for example.

The one or more buses 157 may be address, data, or control buses, and may include any interconnection mechanism, such as a series of lines on a motherboard or integrated circuit, fiber optics or other optical communication equipment, wireless channels, and the like.

The WAN 199 may include one or more servers 190. For example, the server 190 may correspond to a service provider's server connected to the service provider's network. The Server 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the Server 190 to perform one or more operations. In some example embodiments, the one or more Servers 190 may comprise a root certificate authority (CA) as described in more detail below. One or more Public APs 198 may be connected to the WAN 199 and/or the Internet via wireless or wired link 197. In some examples, the Public AP 198 may correspond to a public WiFi hotspot that is operated by the service provider. The Public AP 198 may be connected and/or operated by a same service provider that is used by a CPE 170 for connecting to the service provider's network and/or the internet. For simplicity, components of the Public AP 198 are not shown, however, it is noted that the Public AP 198 may be implemented similarly as shown and described for CPE 170 in FIG. 1.

In some example embodiments, the CPE 170 and/or Public AP 198 may be configured in accordance with one or more wireless standards such as WiFi related standards (e.g. IEEE 802.11). Although other radio access technologies may be implemented as well, such as ZigBee, Bluetooth, NFC, cellular (e.g. LTE), and/or the like.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UD 110, Public AP 198, CPE 170, Server 190, and other functions as described herein.

In general, the various example embodiments of the UD 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the various exemplary embodiments, the exemplary embodiments will now be described with greater specificity.

Various embodiments described herein allow end-user mobile devices that are associated with a given residential in-home network, to negotiate a connection back to its native in-home service, via a public WiFi service (such as a Service Provider WiFi Hotspot for example) using an automated and auto-configured network level VPN. This may be performed automatically and transparently, without needing any special activation or interaction from the end-user.

Various example embodiments generally allow a service provider to provide customer provided equipment (CPE) to a residential customer, where the CPE is pre-configured with a digital certificate (such as a X.509 certificate for example). The digital certificate may be issued by a root certificate authority managed by the service provider or some other federated third party. A user device that is connected to the in-home residential network may become part of the chain of trust, and thus be "assigned" a digital certificate by the intermediate, such as the CPE for example. A software update may then be provided to the user device, so that the device is allowed to make use of the digital certificate when performing WiFi SSID discovery. Once the user device is part of the chain of trust, and has the proper WiFi update, the user device may use a probe request message (such as an 802.11 Probe Request message for example), where the value of a SSID field is set to, for example, '0' or 'NULL' instead of advertising its residential home network SSID for security reasons. Vendor specific fields (e.g. ID=221 which refers to the element ID for vendor specific information elements) may indicate support for the "Residential WiFi Roaming" and also may include the digital certificate.

Upon receiving the probe message from the user device, a public AP may query its root certificate authority to verify and validate the information provided by the user device. If a positive match is made, the public AP may then initiate an L2VPN connection between itself and the user device's CPE (or the vG in the case of a vCPE). It is noted that the public AP may also be either preconfigured or previously issued a digital certificate which allows, for example, the user device to verify the public AP as trusted. Once the L2VPN connection is established, the public AP then issues a probe response message (such as an 802.11 Probe Response message) back to the user device. The probe response message may indicate the device's in-home WiFi SSID in the SSID field of the probe response message. Vendor Specific fields may also be used to indicate to one or more of the following: Digital Certificate (allowing for the device to validate the AP in return); time limits; and/or bandwidth/capacity estimates across the L2VPN. The public AP has several means of operations during this process, such as spawning a virtualized AP process dedicated to this connection, or manage it as part of a larger pool of SSID for example.

In some example embodiments, there is no need for the public AP to publicly broadcast or advertise the user device's in-home SSID information. Rather, the public AP may share the in-home SSID information in the probe response message. The user device can initiate the authentication/association messaging phases (such as the typical 802.11 Authentication and Association) when the probe response message is received. The public AP may keep the L2VPN and private SSID facilities in place for a set amount of time (such as up to 5 minutes for example) after the last WiFi frame is received by the user device so as to limit unnecessary signaling traffic and VPN management cycles.

Although the VPN connectivity is generally described herein as an L2VPN/MPLS this should not be seen as limiting, and the VPN connectivity could just as well be done with, for example, L3VPN services (such as GRE tunneling for example).

Figure 2:
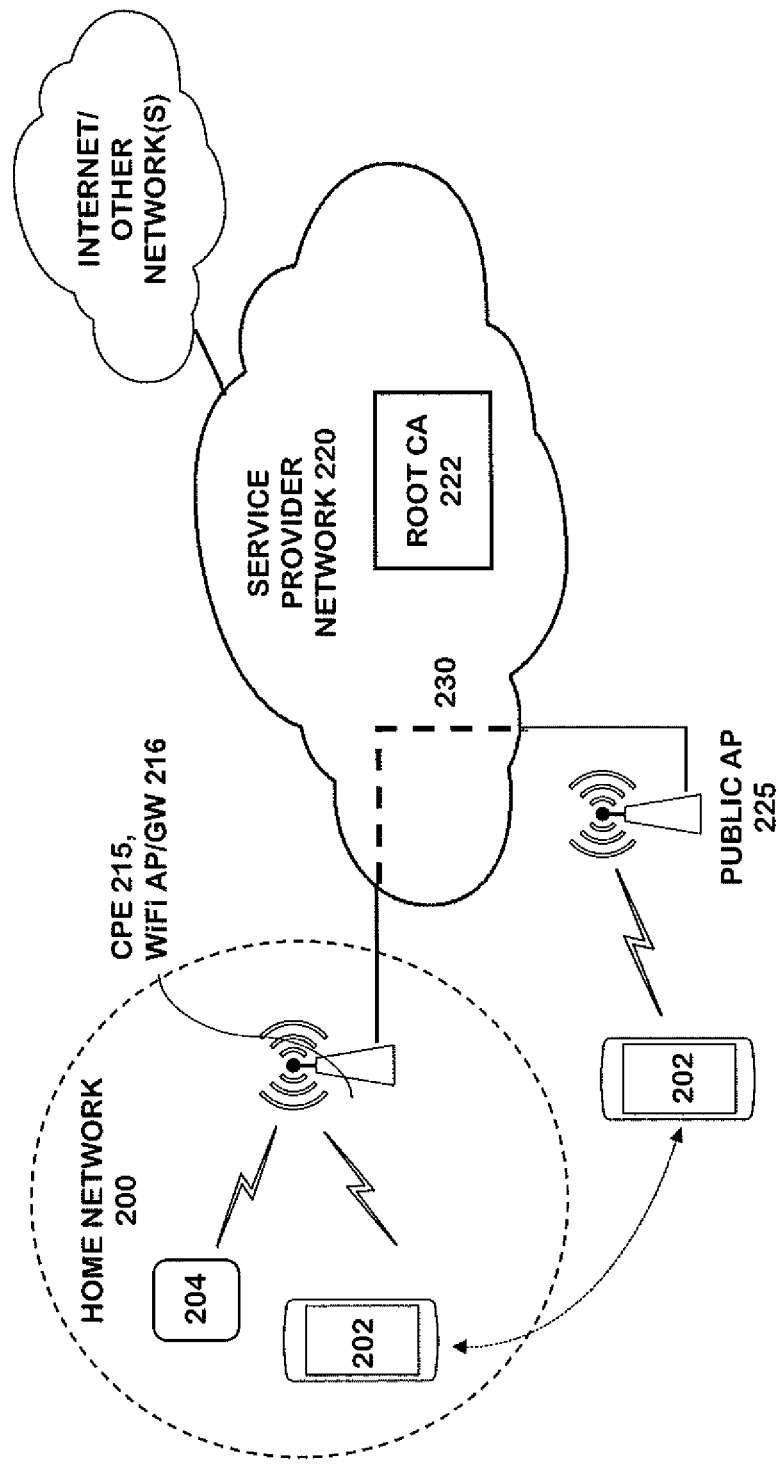
FIG. 2 is an example diagram of a user device moving between a home network and wide area network in accordance with various example embodiments.

Referring now to FIG. 2, this figure shows a non-limiting example of a user device moving between a home network and wide area network in accordance with some example embodiments. In this example, a WiFi enabled user device 202 initially connects to a home network 200 through CPE 215. The CPE 215 provides access to the home network 200 for one or more other further devices as represented by device 204. The range of the CPE 215 is represented by the dashed circle in FIG. 2. In this example, the CPE 215 may function as a WiFi access point and a residential gateway to connect the home network 200 to service provider network 220 as represented by 216. The service provider network 220 may provide the home network 200 connectivity to one or more further networks and/or the internet.

The service provider network 220 may include a Root Certificate Authority (CA) 222, which may for example be implemented by one or more servers. The CPE 215 may be pre-registered (or otherwise have an established association) with the Root CA 222 which is operated by the service provider. The user device 202 may then register with CPE 215 and the user device 202 may be provided with a unique digital certificate (such as a X.509 for example). This process is generally referred to herein as the 'Registration Process' and is described in more detail below. The registration process can provide the user device with residential WiFi roaming capability and may be performed, for example, via a web-interface. As such, the registration process may create a chain of trust between the service provider's network 220, the CPE 215, and the user device 202.

When the mobile device 202 is outside of the home network, it has the ability to advertise its capability for 'residential WiFi Roaming' to outside public WiFi APs such as represented by Public AP 225 in FIG. 2. If the Public AP 225 is part of the service provider network 220 and also supports the 'residential WiFi Roaming' feature, then the Public AP 225 may create a virtual private network connection, as represented by dashed line 230, back to other devices that are connected to the in-home residential network, such as device 204 for example. The connection 230 may be, for example, a layer 2 virtual private network (L2VPN) service, a layer 3 VPN (L3VPN) for example, The Public AP 225 may then start advertising the in-home SSID (along with proper authentication credentials, security) to the user device 202. In this way, the user device 202 not only may connect to a known and private service set identifier (SSID), but also gain a connection to its home network 200, thus allowing for all the same benefits as if the user device 202 was within the range of the CPE 215. This process is generally referred to as the 'Discovery Process' and is described in more detail below.

It is noted that FIG. 2 is merely an example and not intended to be limiting. For example, in some embodiments the Root CA may be operated by a federated third party (such as Cable WiFi Alliance for example), as opposed to be operated by the service provider. It should be understood that more than one CPE 215 may be provided to form the home network 200 (such as the case may be in a mesh network for example). The user device 202, Home AP/CPE 215, and Root CA 222, Public AP 225 and service provider network 220 may be implemented as UD 110, CPE 170, Server 190, Public AP 198, and WAN 199, respectively, as shown in FIG. 1 for example.

Registration Process

Figure 3:
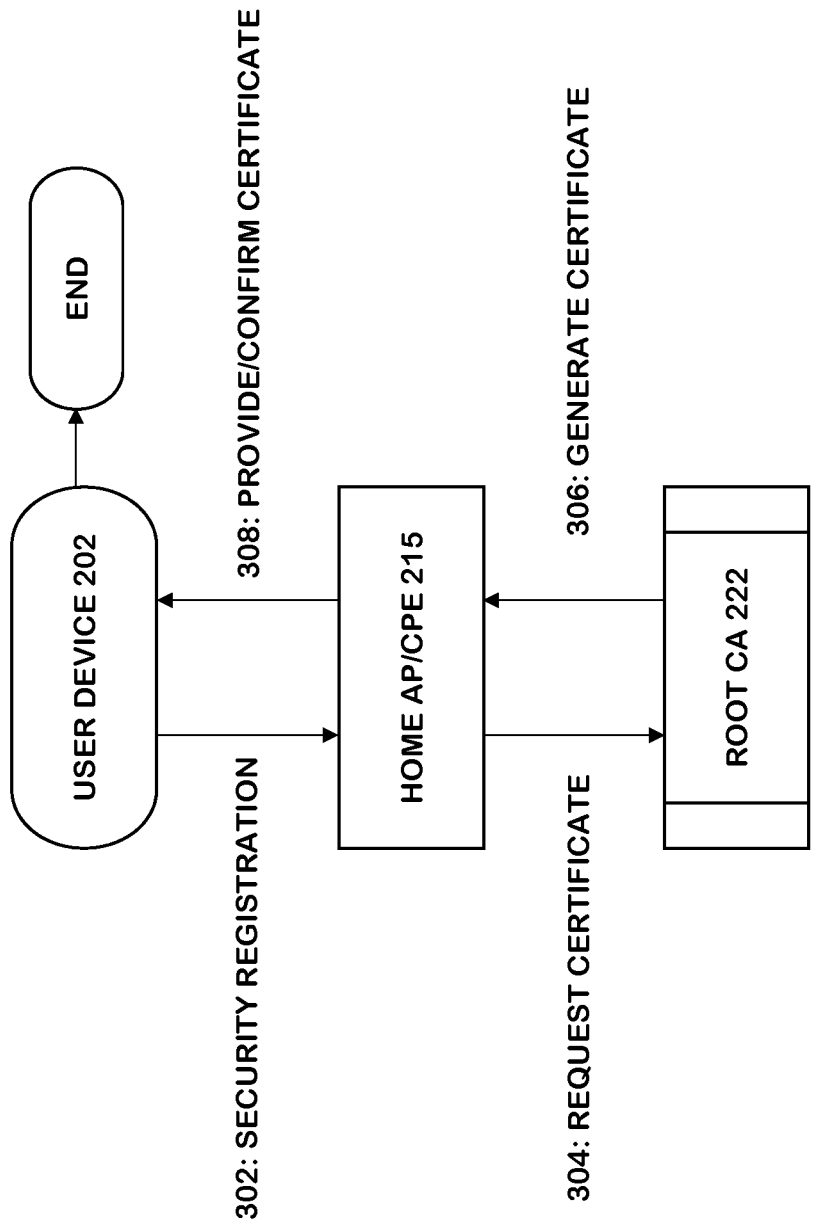
FIG. 3 shows a flow diagram for a registration process in accordance with various example embodiments.

Referring to FIG. 3, this figures shows a flow diagram for a registration process in accordance with various example embodiments. In this example, it is assumed that the CPE 215 has been issued a digital certificate by the Root CA 222. At step 302, the user device 202 initiates security registration with the CPE 215 through a communication medium, such as through a web-interface or application programming interface (API) for example. At step 304, CPE 215 contacts the Root CA 222 via a residential gateway requesting that a digital certificate for the user device 202. The Root CA verifies that the CPE 215 is trusted based on the digital certificate of the CPE 215, generates a new digital certificate for the user device 202, and provides the new digital certificate to the CPE 215 as shown at step 306. At step 308, the CPE 215 confirms the registration to the user device 202 by providing the new digital certificate to the user device as proof and validation. The user device 202 is now registered and validated and has been provided a digital certificate for the home network 200.

Discovery Process

Figure 4:
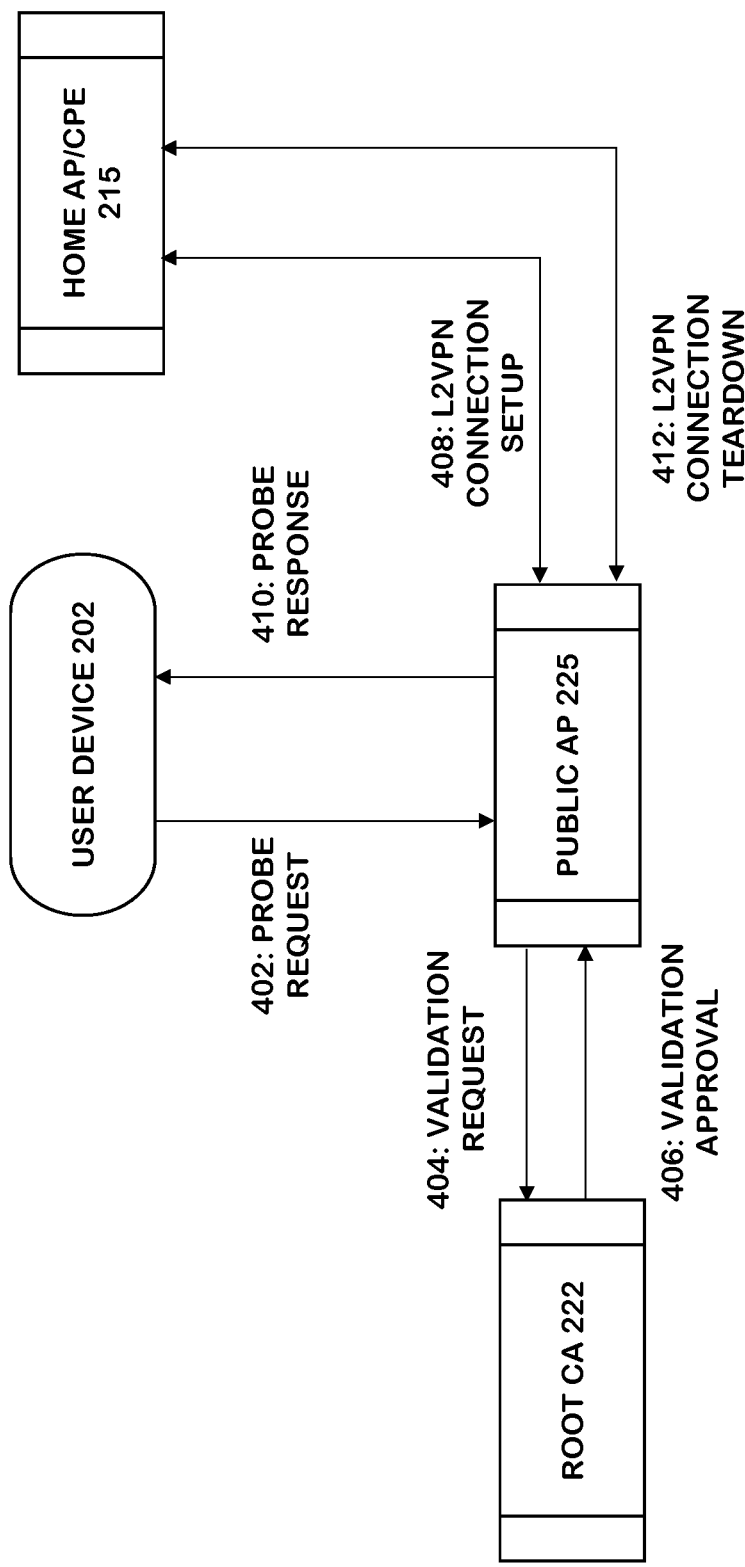
FIG. 4 shows a flow diagram for a discovery process in accordance with various example embodiments.

Referring now to FIG. 4, this figures shows a flow diagram for a discovery process in accordance with various example embodiments. In this example, it is assumed that the user device 202 has previously been provided a digital certificate for the home network 200, such as through the registration process of FIG. 3 for example, and the user device is not connected to the CPE 215.

At step 402, the user device 202 sends a Probe Request message to the Public AP 225 (such as an 802.11 Probe Request message), with an SSID value field set to '0' and using Vendor Specific tags to advertise the digital certificate of the user device 202 (e.g. ID=221). At step 404, the Public AP 225 contacts the Root CA 222 requesting validation of the digital certificate of the user device 202. At step 406 the Root CA 222 verifies the digital certificate of the mobile device and indicates the certificate has been approved to the Public AP 225. At step 408, the Public AP 225, will initiate a L2VPN (or some other means of VPN connectivity) to the CPE 215 associated with the user device 202. Upon setting up a L2VPN connection back to the CPE 215, the Public AP 225 will provide a Probe Response (such as an 802.11 Probe response for example) back to the user device 202. The probe response includes the 'home' SSID of the user device 202, CA digital certificate (for security validation), and any necessary session information (such as time limits, bandwidth limits, and/or the like). When the user device 202 unregisters from the public network of the Public AP 225 (or due to one or more inactivity timers for example), the Public AP 225 will terminate the L2VPN connection to the CPE 215 at step 412.

Figure 5:
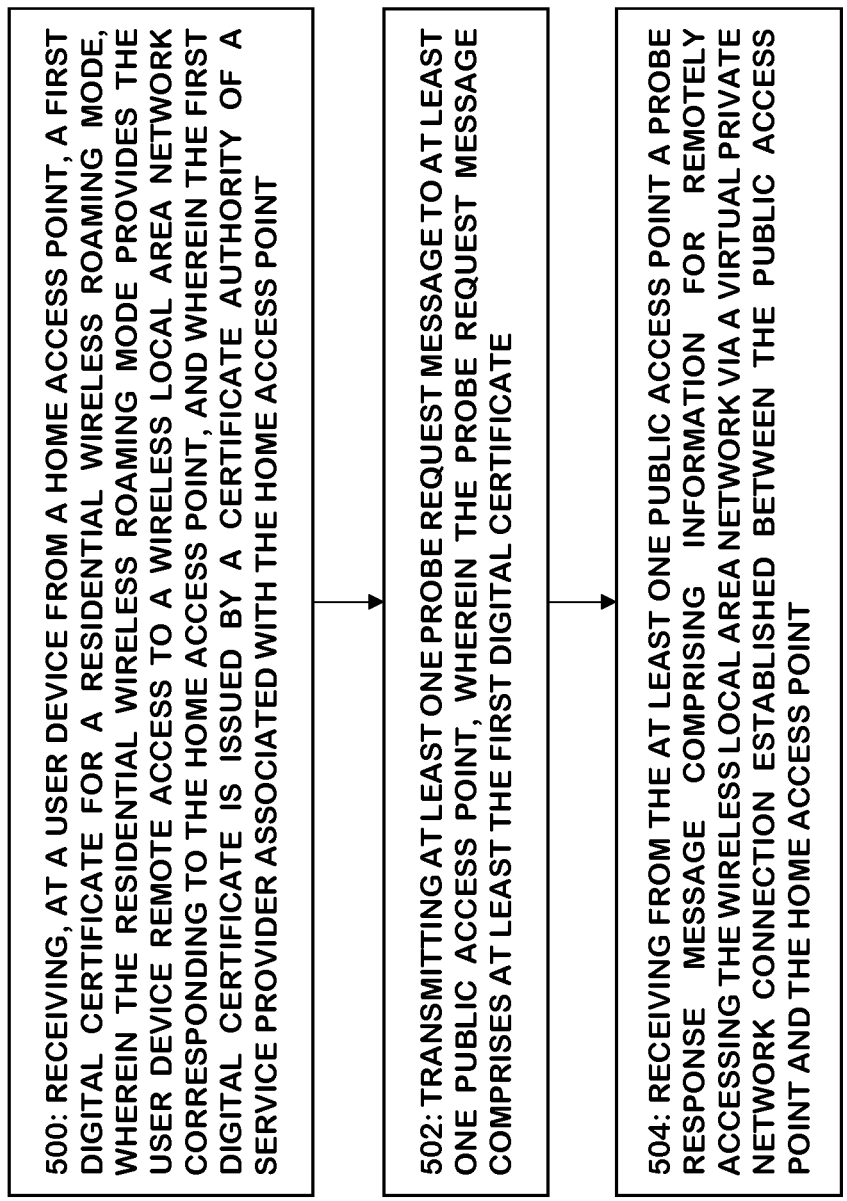
FIGS. 5-7 are logic flow diagrams for facilitating residential wireless roaming via VPN connectivity over Public Service Provider Networks, and illustrate the operation of exemplary methods, a result of execution of computer program instructions embodied on a computer readable memory, functions performed by logic implemented in hardware, and/or interconnected means for performing functions in accordance with exemplary embodiments.

FIG. 5 is a logic flow diagram for facilitating residential wireless roaming via VPN connectivity over Public Service Provider Networks. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the access module 140-1 and/or 140-2 may include multiples ones of the blocks in FIG. 5, where each included block is an interconnected means for performing the function in the block. The blocks in FIG. 5 are assumed to be performed by the UD 110, e.g., under control of the access module 140-1 and/or 140-2 at least in part.

In an example embodiment, a method is provided including: receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point as indicated by block 500; transmitting at least one probe request message to at least one public access point, wherein the probe request message comprises at least the first digital certificate as indicated by block 502; and receiving from the at least one public access point a probe response message comprising information for remotely accessing the wireless local area network via a virtual private network connection established between the public access point and the home access point as indicated by block 504.

The probe request message may include a first vendor specific field indicating the first digital certificate; and a second vendor specific field indicating that the user device supports the residential wireless roaming mode. The probe request message may include a service set identifier field, and wherein a value of a service set identifier field of the probe request message is set to zero or null, and wherein a service set identifier of the wireless local area network is identified in the first digital certificate. The probe response message may include a second digital certificate issued by the certificate authority and a service set identifier identifying the wireless local area network corresponding to the home access point. The method may further include in response to receiving the probe response message: validating the at least one public access point based on the second digital certificate; and performing authentication and association procedures with the home access point via the virtual private network connection. The probe response message may include an indication of a bandwidth limit and/or time limit for the virtual private network connection established between the public access point and the home access point. The probe request message may be an 802.11 probe request message. The probe response message is an 802.11 probe response message. The first digital certificate may be a X.509 digital certificate. The method may include: connecting to at least one other device connected to the local access network through the virtual private network connection. The virtual private network connection may include either a layer 2 virtual private network connection or a layer 3 virtual private network connection.

According to another example of an embodiment, an apparatus is provided including: means for receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; means for transmitting at least one probe request message to at least one public access point, wherein the probe request message comprises at least the first digital certificate; and means for receiving from the at least one public access point a probe response message comprising information for remotely accessing the wireless local area network via a virtual private network connection established between the public access point and the home access point.

The probe request message may include a first vendor specific field indicating the first digital certificate; and a second vendor specific field indicating that the user device supports the residential wireless roaming mode. The probe request message may include a service set identifier field, and wherein a value of a service set identifier field of the probe request message is set to zero or null, and wherein a service set identifier of the wireless local area network is identified in the first digital certificate. The probe response message may include a second digital certificate issued by the certificate authority and a service set identifier identifying the wireless local area network corresponding to the home access point. The apparatus may further include in response to receiving the probe response message: means for validating the at least one public access point based on the second digital certificate; and performing authentication and association procedures with the home access point via the virtual private network connection. The probe response message may include an indication of a bandwidth limit and/or time limit for the virtual private network connection established between the public access point and the home access point. The probe request message may be an 802.11 probe request message. The probe response message is an 802.11 probe response message. The first digital certificate may be a X.509 digital certificate. The apparatus may include: means for connecting to at least one other device connected to the local access network through the virtual private network connection. The virtual private network connection may include either a layer 2 virtual private network connection or a layer 3 virtual private network connection.

According to another example of an embodiment, an apparatus is provided including at least one processor; and at least one memory including computer program code, the at least one memory and computer program code configured to, with the at least one processor, cause the apparatus at least to receive, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; transmit at least one probe request message to at least one public access point, wherein the probe request message comprises at least the first digital certificate; and receive from the at least one public access point a probe response message comprising information for remotely accessing the wireless local area network via a virtual private network connection established between the public access point and the home access point.

The probe request message may include a first vendor specific field indicating the first digital certificate; and a second vendor specific field indicating that the user device supports the residential wireless roaming mode. The probe request message may include a service set identifier field, and wherein a value of a service set identifier field of the probe request message is set to zero or null, and wherein a service set identifier of the wireless local area network is identified in the first digital certificate. The probe response message may include a second digital certificate issued by the certificate authority and a service set identifier identifying the wireless local area network corresponding to the home access point. The at least one memory and computer program code may be configured to, with the at least one processor, cause the apparatus to: in response to reception of the probe response message: validate the at least one public access point based on the second digital certificate; and perform authentication and association procedures with the home access point via the virtual private network connection. The probe response message may include an indication of a bandwidth limit and/or time limit for the virtual private network connection established between the public access point and the home access point. The probe request message may be an 802.11 probe request message. The probe response message is an 802.11 probe response message. The first digital certificate may be a X.509 digital certificate. The at least one memory and computer program code may be configured to, with the at least one processor, cause the apparatus to connect to at least one other device connected to the local access network through the virtual private network connection. The virtual private network connection may include either a layer 2 virtual private network connection or a layer 3 virtual private network connection.

According to another example of an embodiment, a computer readable medium is provided including program instructions for causing an apparatus to perform at least the following: a method is provided including: receiving, at a user device from a home access point, a first digital certificate for a residential wireless roaming mode, wherein the residential wireless roaming mode provides the user device remote access to a wireless local area network corresponding to the home access point, and wherein the first digital certificate is issued by a certificate authority of a service provider associated with the home access point; transmitting at least one probe request message to at least one public access point, wherein the probe request message comprises at least the first digital certificate; and receiving from the at least one public access point a probe response message comprising information for remotely accessing the wireless local area network via a virtual private network connection established between the public access point and the home access point.

The probe request message may include a first vendor specific field indicating the first digital certificate; and a second vendor specific field indicating that the user device supports the residential wireless roaming mode. The probe request message may include a service set identifier field, and wherein a value of a service set identifier field of the probe request message is set to zero or null, and wherein a service set identifier of the wireless local area network is identified in the first digital certificate. The probe response message may include a second digital certificate issued by the certificate authority and a service set identifier identifying the wireless local area network corresponding to the home access point. The program instructions may cause the apparatus to perform in response to receiving the probe response message: validating the at least one public access point based on the second digital certificate; and performing authentication and association procedures with the home access point via the virtual private network connection. The probe response message may include an indication of a bandwidth limit and/or time limit for the virtual private network connection established between the public access point and the home access point. The probe request message may be an 802.11 probe request message. The probe response message is an 802.11 probe response message. The first digital certificate may be a X.509 digital certificate. The program instructions may cause the apparatus to perform: connecting to at least one other device connected to the local access network through the virtual private network connection. The virtual private network connection may include either a layer 2 virtual private network connection or a layer 3 virtual private network connection.

Figure 6:
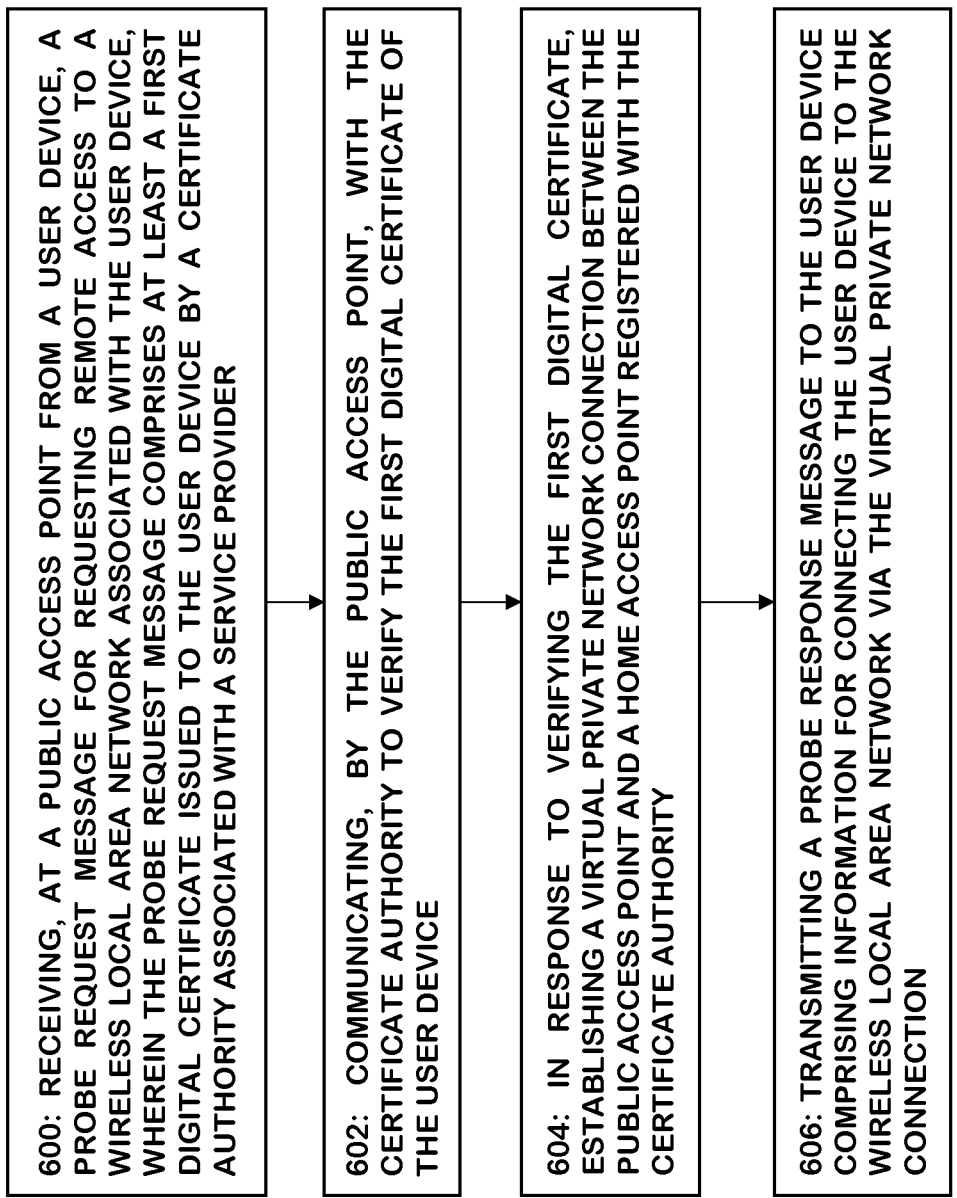

FIG. 6 is a logic flow diagram for facilitating residential wireless roaming via VPN connectivity over Public Service Provider Networks. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150-1 and/or 150-2 may include multiples ones of the blocks in FIG. 6, where each included block is an interconnected means for performing the function in the block. The blocks in FIG. 6 are assumed to be performed by an access point such as Public AP 198, e.g., under control of the configuration module 150-1 and/or 150-2 at least in part.

According to an example embodiment, a method is provided including: receiving, at a public access point from a user device, a probe request message for requesting remote access to a wireless local area network associated with the user device, wherein the probe request message comprises at least a first digital certificate issued to the user device by a certificate authority associated with a service provider as indicated by block 600; communicating, by the public access point, with the certificate authority to verify the first digital certificate of the user device as indicated by block 602; in response to verifying the first digital certificate, establishing a virtual private network connection between the public access point and a home access point registered with the certificate authority as indicated by block 604; and transmitting a probe response message to the user device comprising information for connecting the user device to the wireless local area network via the virtual private network connection as indicated by block 606.

The probe request message may include a service set identifier field, where a value of a service set identifier field of the probe request message is set to zero or null. A service set identifier of the wireless local area network may be identified in the first digital certificate. The probe response message may include a second digital certificate issued by the certificate authority to the public access point and a service set identifier identifying the wireless local area network. The probe response message may include an indication of a bandwidth limit and/or time limit for the virtual private network connection established between the public access point and the home access point. The probe request message may be an 802.11 probe request message. The probe response message may be an 802.11 probe response message. The first digital certificate may be a X.509 digital certificate. The virtual private network connection may connect the user device to at least one other device connected to the local access network. The virtual private network connection may include either a layer 2 virtual private network connection or a layer 3 virtual private network connection.

According to another example of an embodiment, an apparatus is provided including: means for receiving, at a public access point from a user device, a probe request message for requesting remote access to a wireless local area network associated with the user device, wherein the probe request message comprises at least a first digital certificate issued to the user device by a certificate authority associated with a service provider; means for communicating, by the public access point, with the certificate authority to verify the first digital certificate of the user device; in response to verifying the first digital certificate, establishing a virtual private network connection between the public access point and a home access point registered with the certificate authority; and means for transmitting a probe response message to the user device comprising information for connecting the user device to the wireless local area network via the virtual private network connection.

The probe request message may include a service set identifier field, where a value of a service set identifier field of the probe request message is set to zero or null. A service set identifier of the wireless local area network may be identified in the first digital certificate. The probe response message may include a second digital certificate issued by the certificate authority to the public access point and a service set identifier identifying the wireless local area network. The probe response message may include an indication of a bandwidth limit and/or time limit for the virtual private network connection established between the public access point and the home access point. The probe request message may be an 802.11 probe request message. The probe response message may be an 802.11 probe response message. The first digital certificate may be a X.509 digital certificate. The virtual private network connection may connect the user device to at least one other device connected to the local access network. The virtual private network connection may include either a layer 2 virtual private network connection or a layer 3 virtual private network connection.

According to another example of an embodiment, an apparatus is provided including at least one processor; and at least one memory including computer program code, the at least one memory and computer program code configured to, with the at least one processor, cause the apparatus at least to receive, at a public access point from a user device, a probe request message for requesting remote access to a wireless local area network associated with the user device, wherein the probe request message comprises at least a first digital certificate issued to the user device by a certificate authority associated with a service provider; communicate, by the public access point, with the certificate authority to verify the first digital certificate of the user device; in response to verifying the first digital certificate, establishing a virtual private network connection between the public access point and a home access point registered with the certificate authority; and transmitting a probe response message to the user device comprising information for connecting the user device to the wireless local area network via the virtual private network connection.

The probe request message may include a service set identifier field, where a value of a service set identifier field of the probe request message is set to zero or null. A service set identifier of the wireless local area network may be identified in the first digital certificate. The probe response message may include a second digital certificate issued by the certificate authority to the public access point and a service set identifier identifying the wireless local area network. The probe response message may include an indication of a bandwidth limit and/or time limit for the virtual private network connection established between the public access point and the home access point. The probe request message may be an 802.11 probe request message. The probe response message may be an 802.11 probe response message. The first digital certificate may be a X.509 digital certificate. The virtual private network connection may connect the user device to at least one other device connected to the local access network. The virtual private network connection may include either a layer 2 virtual private network connection or a layer 3 virtual private network connection.

According to another example of an embodiment, a computer readable medium is provided including program instructions for causing an apparatus to perform at least the following: receiving, at a public access point from a user device, a probe request message for requesting remote access to a wireless local area network associated with the user device, wherein the probe request message comprises at least a first digital certificate issued to the user device by a certificate authority associated with a service provider; communicating, by the public access point, with the certificate authority to verify the first digital certificate of the user device; in response to verifying the first digital certificate, establishing a virtual private network connection between the public access point and a home access point registered with the certificate authority; and transmitting a probe response message to the user device comprising information for connecting the user device to the wireless local area network via the virtual private network connection.

The probe request message may include a service set identifier field, where a value of a service set identifier field of the probe request message is set to zero or null. A service set identifier of the wireless local area network may be identified in the first digital certificate. The probe response message may include a second digital certificate issued by the certificate authority to the public access point and a service set identifier identifying the wireless local area network. The probe response message may include an indication of a bandwidth limit and/or time limit for the virtual private network connection established between the public access point and the home access point. The probe request message may be an 802.11 probe request message. The probe response message may be an 802.11 probe response message. The first digital certificate may be a X.509 digital certificate. The virtual private network connection may connect the user device to at least one other device connected to the local access network. The virtual private network connection may include either a layer 2 virtual private network connection or a layer 3 virtual private network connection.

Figure 7:
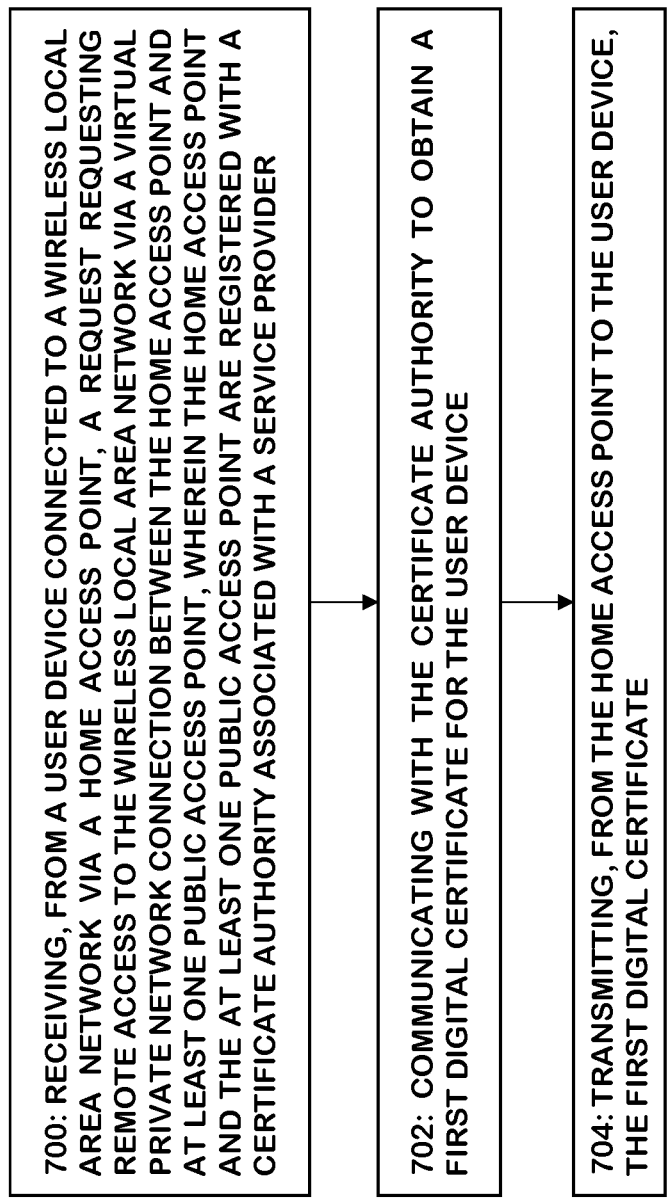

FIG. 7 is a logic flow diagram for facilitating residential wireless roaming via VPN connectivity over Public Service Provider Networks. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150-1 and/or 150-2 may include multiples ones of the blocks in FIG. 7, where each included block is an interconnected means for performing the function in the block. The blocks in FIG. 7 are assumed to be performed by a consumer provided equipment such as CPE 170, e.g., under control of the configuration module 150-1 and/or 150-2 at least in part.

According to an example embodiment, a method is provided including: receiving, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider as indicated by block 700; communicating with the certificate authority to obtain a first digital certificate for the user device as indicated by block 702; and transmitting, from the home access point to the user device, the first digital certificate as indicated by block 704.

The method may include establishing the virtual private network connection between the home access point and the at least one public access point; and providing the user device access to the wireless local area network via the virtual private network connection. The virtual private network connection comprises either a layer 2 virtual private network connection or a layer 3 virtual private network connection.

According to another example of an embodiment, an apparatus is provided including: means for receiving, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; means for communicating with the certificate authority to obtain a first digital certificate for the user device; and means for transmitting, from the home access point to the user device, the first digital certificate.

The apparatus may include means for establishing the virtual private network connection between the home access point and the at least one public access point; and means for providing the user device access to the wireless local area network via the virtual private network connection. The virtual private network connection comprises either a layer 2 virtual private network connection or a layer 3 virtual private network connection.

According to another example of an embodiment, an apparatus is provided including at least one processor; and at least one memory including computer program code, the at least one memory and computer program code configured to, with the at least one processor, cause the apparatus at least to receive, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; communicate with the certificate authority to obtain a first digital certificate for the user device; and transmit, from the home access point to the user device, the first digital certificate.

The at least one memory and computer program code may be configured to, with the at least one processor, to cause the apparatus at least to establish the virtual private network connection between the home access point and the at least one public access point; and provide the user device access to the wireless local area network via the virtual private network connection. The virtual private network connection comprises either a layer 2 virtual private network connection or a layer 3 virtual private network connection.

According to another example of an embodiment, a computer readable medium is provided including program instructions for causing an apparatus to perform at least the following: receiving, from a user device connected to a wireless local area network via a home access point, a request requesting remote access to the wireless local area network via a virtual private network connection between the home access point and at least one public access point, wherein the home access point and the at least one public access point are registered with a certificate authority associated with a service provider; communicating with the certificate authority to obtain a first digital certificate for the user device; and transmitting, from the home access point to the user device, the first digital certificate.

The program instructions may further cause the apparatus to perform: establishing the virtual private network connection between the home access point and the at least one public access point; and providing the user device access to the wireless local area network via the virtual private network connection. The virtual private network connection comprises either a layer 2 virtual private network connection or a layer 3 virtual private network connection.

Without in any way limiting the scope, interpretation, or application of the claims appearing below, a technical effect of one or more of the example embodiments disclosed herein is to gaining access to a residential in-home network without having to manually configure and maintain, e.g., a private VPN. Another technical effect of one or more of the example embodiments disclosed herein is providing the ability to connect to the same SSID used at the in-home residential service, instead of another private or public SSID. Another technical effect of one or more of the example embodiments bringing the concept of Public Hotspot roaming used ubiquitously today by service providers today, back into the hands of the end-user, such that a personal home network can follow a user around, wherever the user goes. Another technical effect of one or more of the example embodiments a much higher level of security by providing a means of preventing "false" open SSID services, or man-in-the-middle type of attacks Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

AP access point
CA certificate authority
CPE customer premises equipment
DNS domain name service
I/F interface
L2VPN layer 2 virtual private network
N/W network
Rx receiver
SSID service set identifier
Tx transmitter
UD user device (e.g., a wireless, typically mobile device)
VPN virtual private network

What is claimed is:

1. A method comprising:
   receiving, at a user device from a home access point via a wireless local area network corresponding to the home access point, a first digital certificate for a residential wireless roaming mode, wherein the residential wireless roaming mode provides the user device remote access to the wireless local area network corresponding to the home access point from at least one public access point, wherein the wireless local area network is a residential in-home network, and wherein the first digital certificate is issued by a certificate authority of a service provider associated with the home access point, wherein the certificate authority is managed by the service provider or a federated third party;
   transmitting, while the user device is outside the wireless local area network corresponding to the home access point, at least one probe request message to the at least one public access point, wherein the at least one probe request message comprises at least the first digital certificate, wherein the at least one probe request message comprises:
   a first vendor specific field indicating the first digital certificate; and
   a second vendor specific field indicating that the user device supports the residential wireless roaming mode; and
   receiving from the at least one public access point a probe response message comprising information for remotely accessing the wireless local area network corresponding to the home access point, with the user device, via a virtual private network connection established between the at least one public access point and the home access point.

2. The method as in claim 1, wherein the at least one probe request message comprises a service set identifier field, and wherein a value of the service set identifier field of the at least one probe request message is set to zero or null, and wherein a service set identifier of the wireless local area network is identified in the first digital certificate.

3. The method as in claim 1, wherein the probe response message comprises a second digital certificate issued by the certificate authority and a service set identifier identifying the wireless local area network corresponding to the home access point.

4. The method as in claim 3, further comprising, in response to receiving the probe response message:
validating the at least one public access point based on the second digital certificate; and
performing authentication and association procedures with the home access point via the virtual private network connection.

5. The method as in claim 1, wherein the probe response message further comprises an indication of a bandwidth limit and/or time limit for the virtual private network connection established between the at least one public access point and the home access point.

6. The method as in claim 1, wherein:
the at least one probe request message is an 802.11 probe request message; and
the probe response message is an 802.11 probe response message.

7. The method as in claim 1, wherein the first digital certificate is a X.509 digital certificate.

8. The method as in any one of the preceding claims claim 1, further comprising:
connecting to at least one other device connected to the wireless local area network through the virtual private network connection in response to the receiving of the probe response message.

9. The method as in claim 1,
wherein the virtual private network connection comprises either a layer 2 virtual private network connection or a layer 3 virtual private network connection.

10. An apparatus comprising:
circuitry configured to receive at a user device from a home access point via a wireless local area network corresponding to the home access point, a first digital certificate for a residential wireless roaming mode, wherein the residential wireless roaming mode provides the user device remote access to the wireless local area network corresponding to the home access point from at least one public access point, wherein the wireless local area network is a residential in-home network, and wherein the first digital certificate is issued by a certificate authority of a service provider associated with the home access point, wherein the certificate authority is managed by the service provider or a federated third party;
circuitry configured to transmit, while the user device is outside the wireless local area network corresponding to the home access point, at least one probe request message to the at least one public access point, wherein the at least one probe request message comprises at least the first digital certificate, wherein the at least one probe request message comprises:
a first vendor specific field indicating the first digital certificate; and
a second vendor specific field indicating that the user device supports the residential wireless roaming mode; and
circuitry configured to receive from the at least one public access point a probe response message comprising information for remotely accessing the wireless local area network corresponding to the home access point, with the user device, via a virtual private network connection established between the at least one public access point and the home access point.

11. The apparatus as in claim 10, wherein at least one the probe request message comprises a service set identifier field, and wherein a value of the service set identifier field of the at least one probe request message is set to zero or null, and wherein a service set identifier of the wireless local area network is identified in the first digital certificate.

12. The apparatus as in claim 10, wherein the probe response message comprises a second digital certificate issued by the certificate authority and a service set identifier identifying the wireless local area network corresponding to the home access point.

13. The apparatus as in claim 12, further comprising:
circuitry configured to validate, in response to receiving the probe response message, the at least one public access point based on the second digital certificate; and
circuitry configured to perform, in response to receiving the probe response message, authentication and association procedures with the home access point via the virtual private network connection.

14. The apparatus as in claim 10, wherein the probe response message further comprises an indication of a bandwidth limit and/or time limit for the virtual private network connection established between the at least one public access point and the home access point.

15. The apparatus as in claim 10, wherein:
the at least one probe request message is an 802.11 probe request message; and
the probe response message is an 802.11 probe response message.

16. The apparatus as in claim 10, wherein the first digital certificate is a X.509 digital certificate.

17. The method as in claim 10, further comprising:
connecting to at least one other device connected to the wireless local area network through the virtual private network connection.

18. The method as in claim 10, wherein the virtual private network connection comprises either a layer 2 virtual private network connection or a layer 3 virtual private network connection.

19. A non-transitory computer readable medium comprising program instructions for causing an apparatus to perform at least the following:
receiving, at a user device from a home access point via a wireless local area network corresponding to the home access point, a first digital certificate for a residential wireless roaming mode, wherein the residential wireless roaming mode provides the user device remote access to the wireless local area network corresponding to the home access point from at least one public access point, wherein the wireless local area network is a residential in-home network, and wherein the first digital certificate is issued by a certificate authority of a service provider associated with the home access point, wherein the certificate authority is managed by the service provider or a federated third party;
transmitting, while the user device is outside the wireless local area network corresponding to the home access point, at least one probe request message to the at least one public access point, wherein the at least one probe request message comprises at least the first digital certificate, wherein the at least one probe request message comprises:
a first vendor specific field indicating the first digital certificate; and a second vendor specific field indicating that the user device supports the residential wireless roaming mode; and receiving from the at least one public access point a probe response message comprising information for remotely accessing the wireless local area network corresponding to the home access point, with the user device, via a virtual private network connection established between the at least one public access point and the home access point.

* * * * *